United States Patent [19]

Silver et al.

[11] 3,893,733
[45] July 8, 1975

[54] FOIL BEARING ARRANGEMENTS

[75] Inventors: Alexander Silver, Tarazana; Johan A. Friedericy, Palos Verdes Estates, both of Calif.

[73] Assignee: The Garrett Corporation, Los Angeles, Calif.

[22] Filed: Dec. 13, 1972

[21] Appl. No.: 314,890

[52] U.S. Cl. ................................................ 308/9
[51] Int. Cl. ............................................ F16c 17/16
[58] Field of Search ......................... 308/121, 9, 160

[56] References Cited
UNITED STATES PATENTS

| 1,409,552 | 3/1922 | Kingsbury | 308/160 |
| 1,664,879 | 4/1928 | Flintermann | 1/1 |
| 3,635,534 | 1/1972 | Barnett | 308/121 |

Primary Examiner—Charles J. Myhre
Assistant Examiner—Frank Susko
Attorney, Agent, or Firm—Jack D. Puffer; Albert J. Miller

[57] ABSTRACT

A self-pressurizing hydrodynamic foil bearing having resilient foils providing support between a movable and stationary bearing member and further having resilient foil supports for supporting and stiffening the foils. The foil supports additionally generate Coulomb friction with another bearing member for enhancing the damping characteristics of the bearing.

6 Claims, 8 Drawing Figures

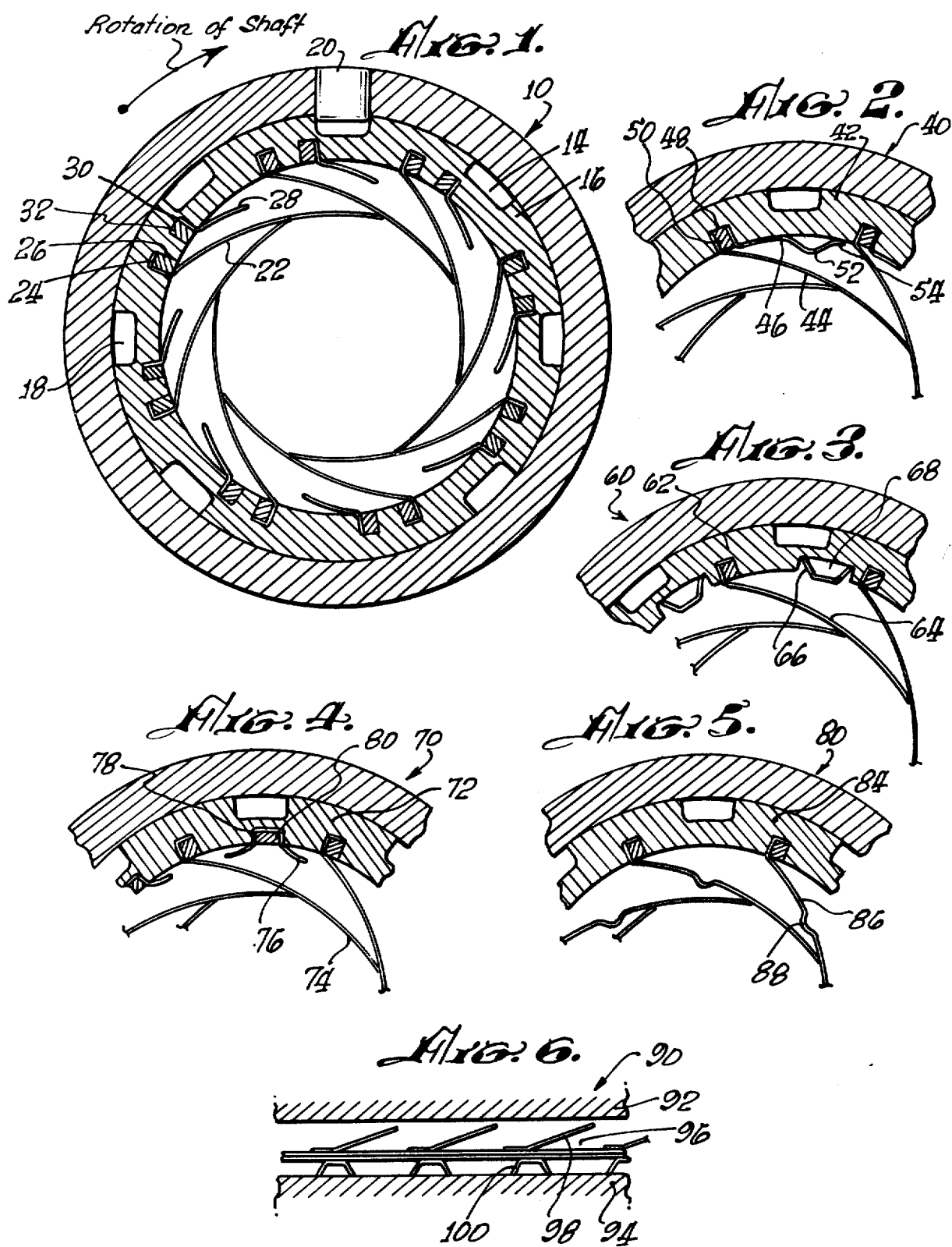

FOIL BEARING ARRANGEMENTS

BACKGROUND OF THE INVENTION

This invention relates generally to self-pressurizing hydrodynamic bearings for providing fluid support between two members movable relative to each other and supported on a thin fluid film. More particularly the invention relates to foil type fluid bearings in which means are provided for stiffening the foils to enhance the load-carrying capabilities of the bearing and to provide dampening and cushioning effects between the two members. A detailed background description of self-pressurizing foil bearings is disclosed in U.S. Pat. No. 3,635,534 entitled "Self-pressurizing Bearings with Resilient Elements."

In resilient foil bearings of this type, the principal difficulties have been limited foil stiffness and oscillatory motions between the movable and stationary member at certain critical bearing speeds. It is a general advantage of foil bearings to have the foil of thin material in order that it may conform to the supported member more uniformly under all conditions. However, the thinner foil is more compliant and thus has a reduced load-bearing capacity. In the case of the second problem, under actual load conditions, the shaft in a high-speed bearing for rotating machines, tends to orbit about the geometric center of the bearing support and the amplitude of the oscillation is maximized at certain critical speeds. In order to control this oscillation, it is desirable to have a substantial amount of damping in the bearing assembly. This problem is especially amplified in the case of smaller journal bearings in which only limited space is available for the bearing assembly.

The present invention overcomes these disadvantages by providing a resilient foil support disposed beneath each of the primary foils and in contact with the primary foil intermediate its ends. This has the effect of increasing the total foil stiffness. At the same time the primary foil may be made of relatively thin material over its entire length so that it will easily conform to the shape of its matching member to provide the optimum fluid bearing under normal operating conditions. In addition, should the bearing shaft develop severe oscillations at certain critical speeds, the foil supports are so arranged that the primary foil tends to rub along the stiffening member during oscillatory motions. This rubbing action produces Coulomb friction which aids in damping the vibration of the shaft.

SUMMARY OF THE INVENTION

The invention described herein provides a simple and inexpensive solution to the problems described above by the insertion in the bearing of foil supports of various shapes to increase the bulk modulus of the foil to increase its load capacity and also to provide damping of induced mechanical oscillations.

DESCRIPTION OF THE DRAWINGS

FIG. 1 is a longitudinal sectional view through a bearing of the invention.

FIGS. 2, 3, 4 and 5 are partial sectional views of alternate embodiments of the invention.

FIG. 6 is a partial sectional view of another embodiment of the invention for use as thrust bearings.

DESCRIPTION OF THE PREFERRED EMBODIMENT

Figure 7:
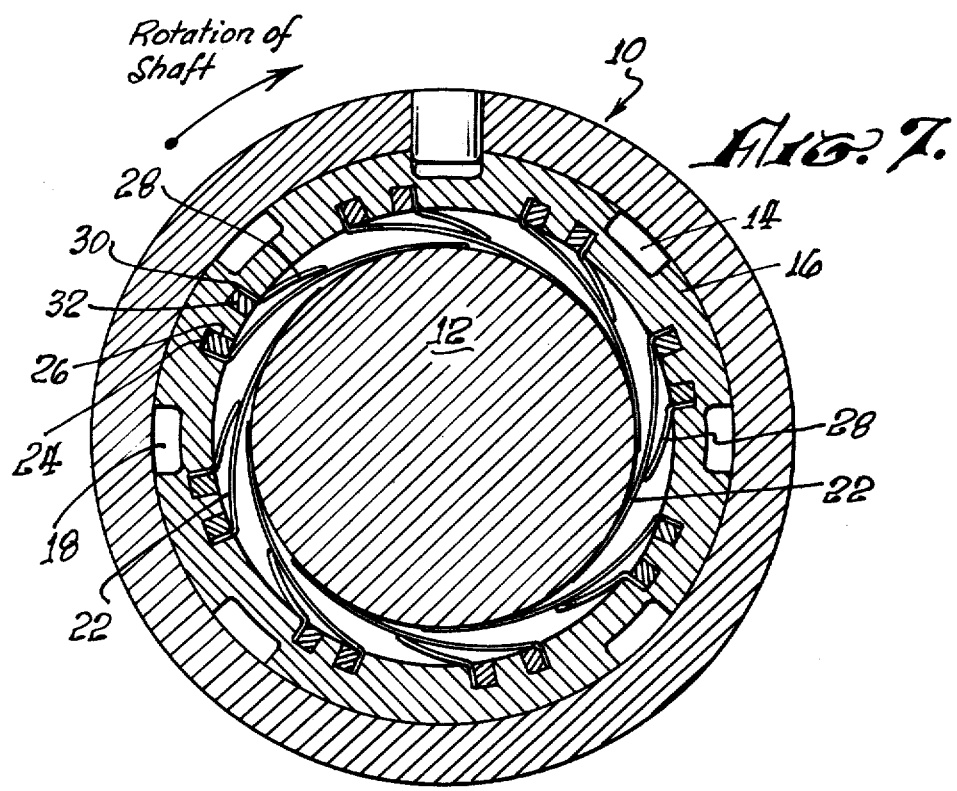
FIG. 7 is a view of the bearing of FIG. 1 including a rotating shaft.

Referring now to FIG. 1 and FIG. 7, there is shown generally at 10 a bearing assembly for supporting a rotating shaft 12. The bearing assembly is comprised of a bearing housing ring 14 supporting a concentric foil carrier ring 16. The carrier ring is provided with axial slots 18 which provide passages for cooling air along the axis of the bearing and also provide for axial pressure balancing of the bearing. One of these slots is used in connection with pin 20 to prevent relative rotation between the housing 14 and the foil carrier 16. The pin 20 extends through the housing member and partially into one of the passages 18 to provide the locking function.

Attached to the inner surface of the carrier ring 16 are a plurality of foils 22 which are seated in axial slots 24 in the retaining ring and retained by slot by the slugs 26. Adjacent each of the foils and in the direction of the rotation of the shaft 12, there is provided a plurality of foil supports 28. The foil supports are likewise inserted in axial slots 30 in the retaining ring and maintained there by slugs 32.

In FIG. 7 there is shown the bearing 10 of FIG. 1 but further having a rotating shaft 12 inserted in the bearing. With the shaft in place it can be seen that the foils 22 are in sliding contact with the foil supports 28. The support thus increases the total stiffness of the foil while at the same time allowing the foil to conform to the shaft throughout the entire length of the foil.

Referring now to the other FIGS. 2, 3, 4, 5 and 6, there are shown alternate embodiments of the invention. In FIG. 2 the foil 44 and the support 46 are attached to the retaining ring 42 in a single retaining slot 48 with a retaining slug 50. When the foil 44 is deflected by insertion of a shaft, the foil will contact the support at the raised arcuate portion shown generally at 52. This action will provide the stiffening effect described above. Additionally, if the supported shaft is oscillating radially when the primary foil contacts the support, the support will deform in its arcuate portion. This deformation will cause the free end of the support to rub on the inner surface of the retaining ring at 54. This rubbing action will generate Coulomb friction and will serve to damp the oscillation of the shaft.

Referring now to FIG. 3, the bearing assembly is shown generally at 60 and has a foil retaining ring 62. Foils 64 are retained in the retaining ring in the same manner as described in connection with FIG. 1 above. However, in this embodiment the support member is a U-shaped spring shown at 68 which is inserted and retained in axial slot 66. This spring member at its open end is of smaller dimension than the width of the slot 66. Thus when the primary foil 64 contacts the spring 68 the same stiffening effect will occur as described above. As the foil deflection is further increased, however, the spring 68 will be compressed which will result in the spreading of the leg portions of the spring to the limits of the width of the slot 66. Thus the spring rate of the spring 68 will be added to that of the foil 64 to increase the bulk modulus of the assembly. Additionally, as the legs of spring 68 rub the surface of the slot 66 the dampening effect will occur as described in connection with FIG. 2 above.

Referring now to FIG. 4, there is shown a bearing assembly at 70 having foils 74 similar to those described above. In this embodiment the support spring is shown at 76 as a bifurcated member inserted in slot 80 in the foil retainer 72 by slug 78. The operation of this embodiment is similar to that described in connection with FIG. 3 above. However, in this embodiment the bifurcated ends of the spring member 76 contact the outwardly radial surface of the primary foil 74 to provide the stiffening and damping during oscillatory motion.

Referring now to FIG. 5, another embodiment of the invention is shown at 80. The foil retaining ring 84 is similar to that described above. The foil members 86 are retained in the foil retainer 84 in the same manner. However, in this embodiment a separate support member is not provided. Rather there is provided on each of the foils 86, an arcuate stiffening ridge shown at 88. In operation, each foil is in contact with the arcuate portion of the adjacent foil which will then serve as the stiffening and damping member.

All the embodiments discussed above have been concerned with foil bearings for supporting a rotating shaft member. The same principles described above are applicable to thrust bearings or bearings for supported parts moving in translation with respect to each other. There is shown in FIG. 6 a thrust bearing 90 having foil base 94 for supporting a member 92 movable with respect to base 94. In this embodiment there is provided a foil carrier 96 to which there is attached on one side thereof a plurality of foils 98. On the opposite side of the carrier there are provided the supporting members 100 illustrated here as similar to those discussed in FIG. 3 above. In operation, the back-up spring 100 will increase the foil assembly spring rate to provide the added stiffness desired. Further, as spring 100 is compressed, the legs will rub against the inner surface of base 94 and provide damping as described in connection with FIG. 3 above.

Figure 8:
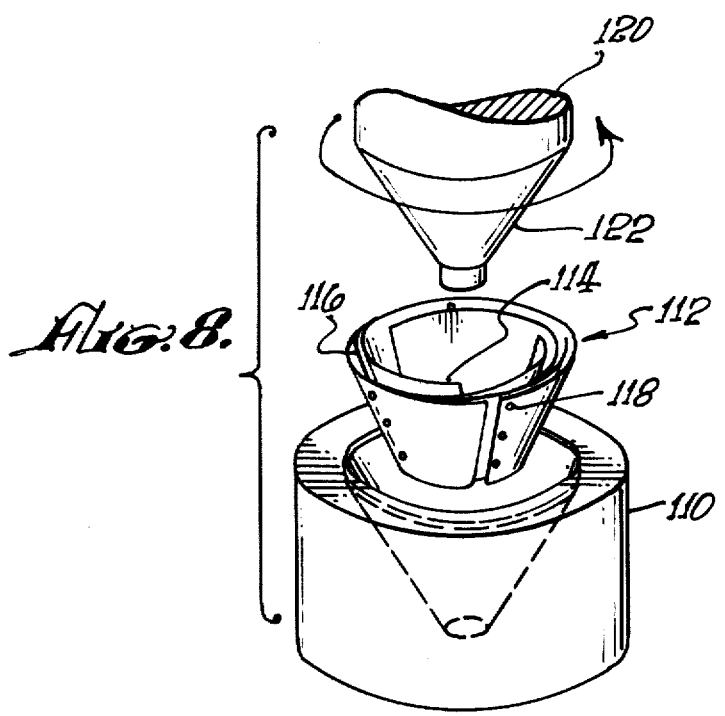
FIG. 8 is a perspective view of a conical bearing incorporating the invention.

Referring now to FIG. 8, there is shown another embodiment of the invention for supporting a conical rotating member. There is provided a bearing housing 110 having a conical opening therein. A conical foil assembly 112 is formed to fit into this opening. The foil assembly 112 is comprised of foils 114 and foil supports 16. Each foil is provided with an individual support fastened to the foil as shown at 118 for stiffening the foil and providing damping action under oscillating loads. The conical bearing is arranged to support a rotating shaft 120 having a conical shaped end 122. In this form a single bearing can provide both radial and axial support for the shaft 120.

As can be seen from the above description, there is provided by this invention in its several embodiments, means for increasing the stiffness of hydrodynamic bearing foils and thus enhancing their load carrying capacity. The effect of this dual spring rate assembly is to allow the incorporation of thin foils for good surface conformance while at the same time providing sufficient support for anticipated loads. Additionally, the supporting member provides damping to air and control of oscillatory motion between bearing members.

While specific embodiments of the invention have been illustrated and described, it is to be understood that these embodiments are provided by way of example only and that the invention is not to be construed as being limited thereto, but only by the proper scope of the following claims.

What we claimed is:

1. A hydrodynamic fluid bearing comprising:
first and second bearing elements movable with respect to each other and spaced apart to form a fluid gap therebetween;
at least one bearing foil attached to one of said bearing elements said foil loosely conforming to the shape of said bearing elements;
foil stiffening means attached to one of said bearing members and contacting said bearing foil at at least one point for increasing the effective stiffness of said bearing foil, said foil stiffening means comprising a generally U-shaped member attached to one of said bearing means at the closed end of said member and the bifurcated open ends being in contact with said bearing foil.

2. A hydrodynamic fluid bearing comprising:
first and second bearing elements movable with respect to each other and spaced apart to form a fluid gap therebetween;
at least one bearing foil attached to one of said bearing elements said foil loosely conforming to the shape of said bearing elements;
foil stiffening means attached to one of said bearing elements and contacting said bearing foil at at least one point for increasing the effective stiffness of said bearing foil, said foil stiffening means comprising a generally U-shaped member arranged between said bearing foil and the bearing element to which said foil is attached such that the open end of said U-shaped member is in contact with said bearing element and the closed end is in contact with said foil member when said bearing elements are assembled in their operating relationship.

3. A hydrodynamic fluid bearing comprising:
first and second bearing elements movable with respect to each other and spaced apart to form a fluid gap therebetween;
at least one bearing foil attached to one of said bearing elements said foil loosely conforming to the shape of said bearing elements, said bearing foil comprising a plurality of overlapping bearing foils; and
foil stiffening means attached to one of said bearing members and contacting said bearing foil at at least one point for increasing the effective stiffness of said bearing foil, said foil stiffening means comprising an arcuate shape formed in each of said foils intermediate the end thereof and forming an axial ridge in said foil surface, said axial ridge being arranged such that each foil is in contact with the ridge of the adjacent foil when said bearing elements are assembled in an operating relationship.

4. A hydrodynamic fluid bearing comprising:
a shaft member rotatable about a longitudinal axis;
shaft supporting means generally coaxial with said shaft member about the longitudinal axis;
first resilient bearing means attached to said shaft supporting means for partially supporting said shaft member in said supporting means in connection with a dynamic fluid film;
said first resilient bearing means comprising a plurality of foils loosely conformed about said shaft member between said shaft member and said shaft supporting means; and
second resilient bearing means for partially supporting said first resilient bearing means, said second resilient bearing means comprising a second plurality of foils interspersed between the foils of said first resilient bearing means for increasing the effective stiffness of said first resilient bearing means.

5. A hydrodynamic fluid bearing comprising:

a shaft member rotatable about a longitudinal axis;

shaft supporting means generally coaxial with said shaft member about the longitudinal axis;

first resilient bearing means attached to said shaft supporting means for partially supporting said shaft member in said supporting means in connection with a dynamic fluid film;

said first resilient bearing means comprising a plurality of foils loosely conformed about said shaft member between said shaft member and said shaft supporting means; and second resilient bearing means for partially supporting said first resilient bearing means, said second resilient bearing means comprising a plurality of generally U-shaped members attached to said shaft supporting means at the closed end of said U and each of said U-shaped members having the legs of the open end thereof in contact with one of said first resilient bearing means for increasing the effective stiffness thereof.

6. A hydrodynamic fluid bearing comprising:

a shaft member rotatable about a longitudinal axis;

shaft supporting means generally coaxial with said shaft member about the longitudinal axis;

first resilient bearing means attached to said shaft supporting means for partially supporting said shaft member in said supporting means in connection with a dynamic fluid film;

said first resilient bearing means comprising a plurality of foils loosely conformed about said shaft member between said shaft member and said shaft supporting means; and second resilient bearing means for partially supporting said first resilient bearing means, said second resilient bearing means comprising a plurality of generally U-shaped members, one of said members being operatively arranged between each of said first resilient bearing means and said shaft supporting means such that the closed end of said U-shaped member is adjacent said second resilient bearing means and the open end of said U-shaped member is adjacent said shaft supporting means.

* * * * *